Patented Mar. 3, 1953

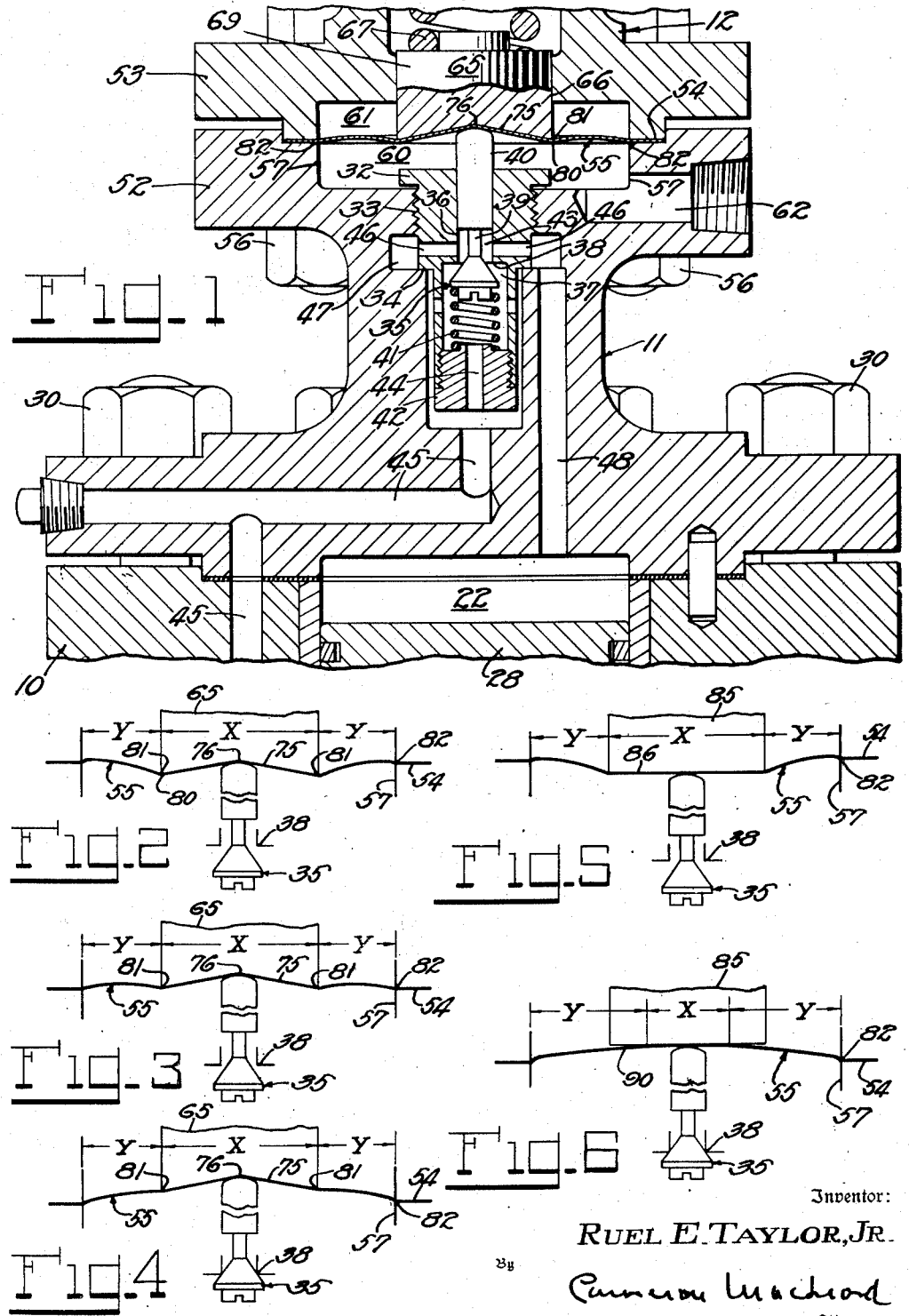

2,630,140

UNITED STATES PATENT OFFICE 2,630,140

DIAPHRAGM MOTOR FOR CONTROL VALVES AND THE LIKE

Ruel E. Taylor, Jr., South Weymouth, Mass., assignor to Mason-Neilan Regulator Company, Boston, Mass., a voluntary association of Massachusetts Application July 30, 1945, Serial No. 607,715

2 Claims. (Cl. 137—790)

This invention relates to fluid operated motors for control valves and the like wherein a diaphragm is employed to actuate a valve member for varying fluid flow, and particularly concerns valves which are suitably operated by a diaphragm of metal or comparable material.

As is well known to those skilled in the art, a control valve diaphragm is responsive to changes in differential between a force generated by fluid under pressure on one side of the diaphragm and an opposing force produced by a spring or equivalent means on the other side of the diaphragm. It will be understood that while the force supplied by a fluid under pressure is distributed equally over the diaphragm area, the force produced by the spring or equivalent means is transmitted to a selected portion only of the diaphragm area by what is commonly known as a diaphragm button. I have found that diaphragm buttons, as heretofore constructed so far as known to me, are a major factor tending to create unstable valve operation, and this invention relates to improved means for transmitting the force of a spring or the like to a diaphragm whereby this factor is eliminated and stable operation may be obtained.

Control valves which are adapted to be extremely sensitive to pressure changes are well known to have a tendency to cycle, and it has been customary to attempt to overcome this tendency in various ways as by retarding the diaphragm movement or reducing its sensitivity, but such methods tend to nullify one of the more desirable features of control valve operation. For example, one of the more sensitive control devices is an auxiliary operated reducing valve. This may include a piston actuated main valve, positioned by changes in operating pressure as governed by a pilot valve, which is in turn positioned by a diaphragm subjected on one side to reduced pressure and the other side to the force exerted by a spring as transmitted by a diaphragm button. As will be understood by those skilled in the art, the pilot valve varies the flow of high pressure fluid to the piston in a manner to open the main valve on a drop in reduced pressure, and vice-versa, in order to maintain the reduced pressure at a value established by a suitable spring adjustment. While auxiliary operated valves, when constructed in accordance with modern methods, are capable of maintaining reduced pressures within extremely close limits under wide changes in load, such valves have a tendency to cycle under adverse flow conditions, especially if they are governing dry fluids such as air or super-heated steam; and for this reason valves of this type have proven unsatisfactory for many control applications.

I have found that if the differential force by which a diaphragm is flexed to actuate a valve member throughout a predetermined range of movement, varies directly with changes in fluid pressure to which the diaphragm is responsive, the valve is inherently stable. In other words, if the force differential varies directly with the fluid pressure change and the fluid pressure change varies proportionately to a change in load demand, the opening assumed by the valve is proportional to the demand and therefore the valve member comes to rest at the proper opening until the load demand again changes. On the other hand, if outside factors enter into the diaphragm movement to upset the direct relation between force differential and fluid pressure change, the valve member fails to assume an opening which is proportional to load demand and either does not open sufficiently to provide the fluid flow required or opens too much so that hunting is initiated and unstable operation results. Assuming that the range of diaphragm movement is such that no substantial change in force is caused by diaphragm tension, I have found that the upsetting factor to the direct relation between the differential force and the fluid pressure change is caused by the diaphragm button as variously constructed heretofore, so far as known to me.

I have discovered that the various constructions adopted in the past for diaphragm buttons, and for their general arrangement in relation to the diaphragm, have resulted in introducing an upsetting factor by varying the effective diaphragm area throughout a portion of the valve stroke. This is occasioned by changes in the supported and unsupported areas of the diaphragm at different positions of diaphragm flex, and therefore the effective force produced by a given fluid pressure, in pounds per square inch, at one valve opening, varies from the effective force produced by the same pressure at another valve opening. Under these conditions the valve fails to assume an opening proportional to load demand under all operating conditions and a tendency to hunt is initiated, particularly when dry fluids, such as air or super-heated steam, are encountered. By the means embodying this invention, the supported and unsupported diaphragm areas are stabilized so that the effective force supplied by a given fluid pressure remains substantially constant throughout the valve stroke. Furthermore, the supported area is so proportioned in relation to the unsupported area that a selected range of diaphragm flex is provided without any substantial change in diaphragm tension, and by the means herein disclosed a highly sensitive control valve with substantially no tendency to hunt or cycle may be provided.

While I hereinafter describe, in connection with the accompanying drawings, an auxiliary operated reducing valve having a diaphragm of metal or comparably pliable material, I wish it to be understood that the construction and arrangement embodying my invention is likewise applicable to motors employing a diaphragm of metal or similar material whether such motors are used in connection with so-called direct acting valves or for the operation of other devices.

Accordingly, it is an object of this invention to provide means for transmitting the force of a spring or equivalent device to the diaphragm of a fluid pressure operated control valve or the like, whereby extremely sensitive control action is combined with stability of operation.

It is an object of this invention to provide means for transmitting the force of a spring or equivalent device to the diaphragm of a fluid pressure operated control valve or the like, whereby the diaphragm movement is substantially in direct proportion to a change in fluid pressure throughout a predetermined range of diaphragm travel.

It is an object of this invention to provide means for transmitting the aforesaid force to the diaphragm of a fluid pressure operated control valve or the like, whereby the effective diaphragm area is substantially constant throughout the diaphragm movement.

It is another object of this invention to provide means for transmitting the aforesaid force to the diaphragm of a fluid pressure operated control valve or the like, whereby the ratio of supported and unsupported areas of the diaphragm remains substantially constant throughout a predetermined range of diaphragm movement.

And it is still another object of this invention to provide means for transmitting a force produced by a resilient member to the diaphragm of a fluid pressure motor which may be used in connection with a control valve for varying fluid flow to a source of demand, whereby the diaphragm responds to a change in fluid pressure resulting from a change in load demand to vary the valve opening in direct proportion to the demand change.

These and other objects of this invention will be more fully pointed out and understood from the following description when taken in connection with the accompanying drawings, in which, Fig. 1 is a vertical section of a portion of an auxiliary operated control valve embodying this invention, showing the pilot diaphragm at the mid-position of the operating range.

Figs. 2, 3 and 4 are diagrammatic views showing the relative positions assumed by the parts illustrated in Fig. 1 at various valve openings.

Figs. 5 and 6 are views in general similar to Figs. 2 and 4, respectively, showing the relative positions of the diaphragm in respect to one common form of diaphragm button, for purposes of comparison.

Having reference to the drawings and particularly to Fig. 1, the device embodying my invention is shown as applied to a standard auxiliary operated control valve of well-known construction, a portion only of the valve being herein illustrated. The valve includes a body 10 having the usual control orifice and valve member cooperating therewith, not shown, for varying fluid flow to a source of demand in direct proportion to demand change. For this purpose the body 10 is provided with a piston 28, mounted to reciprocate in a chamber 22, the piston being in operative connection with the valve member just referred to, and being so arranged that the valve is opened by a downward movement of the piston, and vice versa. The body 10 supports a bonnet 11 on which a spring case 12 is mounted, the lower portion only of the spring case being herein illustrated, for it will be understood that the spring case is also of standard construction.

The bonnet 11 makes a tight joint with the body 10 and may be secured thereto by bolts 30. Within a suitable bore in the bonnet 11, a pilot valve housing 32 is received and is threaded thereto as indicated at 33, the lower portion of the housing being reduced to provide an annular flange 34 which cooperates with a corresponding flange on the bonnet 11 to make a fluid tight joint therewith. The housing 32 includes a pilot valve member 35, and for this purpose is provided with an axially disposed bore 36 which is enlarged at 37 to form a seat 38 with which the valve member cooperates, a suitable stem 39 having an enlarged upper end 40 being adapted to extend through the upper end of the bore 36 with which it makes a reasonably close sliding fit. The valve member 35 is normally closed by a spring 41 which is disposed between the valve member and a cap 42 threaded into the enlarged portion 37 of the bore. The enlarged portion 37 of the bore constitutes a high pressure chamber and that portion of the bore which is between the valve seat 38 and the enlarged end 40 of the valve stem comprises a discharge pressure chamber 43, the former being connected with the high pressure side of the body 10, through a bore 44 in the cap 42 and a fluid passage 45 disposed in the bonnet 11 and body 10, and the latter being in communication with the chamber 22, above the piston 28, through passages 46 in the housing 32 and an annular recess 47 and passage 48 in the bonnet.

The pilot valve 35 is adapted to be positioned in respect to its seat 38 by means of a fluid pressure motor which is housed in the spring case 12 and in the upper portion of the bonnet 11. For this purpose the bonnet and spring case are provided with flanges 52 and 53, respectively, which provide a jointing surface 54 having an inner edge 82 along which the peripheral edge of a diaphragm 55 is clamped by means of bolts 56. The flanges form one wall 57 of a chamber in which the diaphragm motor functions. The diaphragm 55 divides the space enclosed by the bonnet 11 and spring case 12 into a controlled pressure chamber 60 and a spring chamber 61, the former being connected downstream of the valve through a port 62 in the bonnet and a feeler pipe not shown, and the latter being vented to atmosphere through a suitable passage in the spring case also not shown. Within the spring chamber 61, a diaphragm button 65 engages the central portion of the diaphragm. The button 65 is of cylindrical shape and is preferably centered and guided by a cylindrical wall portion 66 of the spring case, the parts being arranged so that the button may reciprocate axially of the spring case substantially without friction. A spring 67 is retained between the diaphragm button 65 and an upper spring button not illustrated, suitable guide bosses, one of which is shown at 69 on the diaphragm button, being provided to center the spring along the axis of the spring case in the usual manner. Means for varying the force initially imparted by the spring may be in the form of the usual adjusting screw. The general construction just described forms no part of this invention it being understood that the parts are required to operate smoothly and freely if they are to respond accurately to slight changes in controlled pressure.

In operation, assuming that the spring 67 is initially tensioned to maintain a selected reduced pressure in the downstream piping, it will be understood that when a change of pressure occurs in the downstream pipe, the pressure change is transmitted through the port 62 to the controlled pressure chamber 60. When an increase of pressure in the chamber 60 occurs, the diaphragm 55 is flexed upwardly against the force imparted by the spring 67 and permits the pilot valve 35 to move towards its seat 38, thereby decreasing the pressure above the piston 28 and reducing the flow through the main valve port. On a decrease of pressure in the pipe 17, the opposite occurs. Inasmuch as the pilot valve 35 operates against leaks which occur around the enlarged end 40 of the pilot valve stem from the discharge chamber 43 to the controlled pressure chamber 60 and around the piston 28 to the outlet side of the valve body, the pilot valve assumes an opening, when the parts are at rest, which will allow just enough fluid to enter the discharge chamber 43 to equal the quantity of fluid passing around the pilot valve stem and around the piston. Therefore, when the pilot valve changes its opening, the change in pilot valve opening and the resulting change in main valve opening should be proportional to the controlled pressure change and accordingly proportional to the change in load. However, if the effective area of the diaphragm 55 varies at different pilot valve openings, the change in pilot valve opening and the resulting change in main valve opening are not proportional to the controlled pressure change, and therefore, even though there is no further change in load demand, an additional change in controlled pressure results which again causes the pilot valve and main valve to adopt new openings in an effort to maintain the valve of the controlled pressure at which the spring 67 is set. Thus an undesirable hunting action is initiated and an unstable control action results. This is particularly true when dry fluids, such as super-heated steam or air, are being governed.

The diaphragm 55 may be of a material, such as metal, suited to the fluid and temperature conditions and its diameter and thickness must be such that it meets the pressure conditions and at the same time may be flexed over a range of movement which accommodates the overall working range of the pilot valve 35 without any substantial change in diaphragm tension. In the valve herein illustrated, it has been found that a diaphragm having a free diameter of approximately 1¾" and a thickness of .010" is adapted to normal operating conditions and provides a highly sensitive response to pressure changes. However, when cycling or hunting is encountered, one common method of eliminating this undesirable condition is to provide a thicker diaphragm; and while the heavier diaphragm may overcome the difficulty, it fails to respond to small pressure changes and therefore causes a so-called drop off and build up of the controlled pressure which may have a range beyond the requirements. Another well-known method of attempting to stabilize valve action is by retarding the response to pressure changes by means of a restriction. However, such an arrangement provides a sluggish valve action which is undesirable.

In order to maintain the effective area of the diaphragm 55 substantially constant throughout the stroke of the pilot valve member 35, I provide the button with a lower surface 75 in the form of a shallow cone the base of which is defined by what is substantially a knife edge 81, said cone having its apex 76 at the axis of the button with which axis the axis of the valve member 35 is preferably aligned. When the diaphragm 55 is subjected to controlled pressure, the central portion of the diaphragm is forced against the lower surface 75 of the button and assumes a contour in substantial correspondence therewith. At the same time the surrounding outer portion of the diaphragm is also subjected to pressure which results in flexing the diaphragm at 80 around the peripheral edge 81 of the bottom surface 75 of the button and around the inner edge 82 of the flanges 52 and 53 and thus provides definite circles of flex around which the diaphragm functions. I have found that by subjecting the central portion of the diaphragm to stress as well as the outer portion, thereby providing a circle of flex around the button edge 81, as well as around the inner edge 82 of the flanges, the diaphragm bends along the circles of flex as the central portion assumes various axial positions under changes of controlled pressure. Therefore, the area of the central portion, which may be termed a supported area, and the area of the outer portion or unsupported area, remain fixed throughout the valve stroke. By this means, the effective diaphragm area remains unchanged throughout its operating range and therefore the differential between the force provided by the spring 67 and the force generated by the controlled pressure varies directly with a change in controlled pressure as will be more clearly understood by reference to the diagrammatic views in Figs. 2, 3 and 4 and by a comparison therewith of the diagrams shown in Figs. 5 and 6.

Referring to Figs. 2, 3 and 4, the relative positions of the parts are therein diagrammatically illustrated and show their relation when the pilot valve 35 is fully open (Fig. 2), partially open (Fig. 3) and in closed position (Fig. 4). In order that the diaphragm may be substantially free from tension caused by flexure stress in the diaphragm material, the selected range of diaphragm movement is preferably around a mean flat position, the lower and upper limits of diaphragm movement being shown in Figs. 2 and 4, respectively, and the mean position being illustrated in Fig. 3, wherein the valve is substantially at mid opening in the position shown in Fig. 1. When the valve 35 is closed, as shown in Fig. 4, the cone shaped lower surface 75 of the button is preferably angled to the button axis so that a line coincident with said surface and projected radially from the axis intersects the side wall 57 substantially at the inner edge 82 of the flange jointing surface 54. It will be noted that by reason of the cone shaped lower surface of the button, the central portion of the diaphragm, having an area value X, is subjected to an upward stress by the pressure in the chamber 60, and it will be understood that the outer portion of the diaphragm, having an area value Y, is also stressed upwardly so that the diaphragm must flex around the peripheral edge 81 of the button and the inner edge 82 of the flanges. Therefore when the diaphragm moves upwardly beyond the position shown in Fig. 3 to the position shown in Fig. 4, it continues to engage the entire bottom surface 75 of the button so that the ratio of the supported area X to the unsupported area Y remains substantially fixed throughout the valve stroke.

To clarify this matter further, it will be helpful to compare the relative positions of the parts in the figures just referred to with the relative positions of the parts shown diagrammatically in Figs. 5 and 6 wherein a button 85 is illustrated and selected as the best form of button heretofore employed so far as known to me. The button 85 is similar to that hereinabove described except that the bottom surface 86 is flat as shown. In Fig. 5 the diaphragm 55 is shown at its lower limit of movement with the valve member 55 fully open, and in Fig. 6 the diaphragm is shown at its upper limit of movement with the valve member closed. It will be noted that in Fig. 5 the bottom surface 86 of the button is below the flange joint 54 so that the central portion or supported area X of the diaphragm is equal to the area of the bottom surface 86 of the button. On the other hand, when the button 85 is at its upper limit of movement, as shown in Fig. 6, the outer portion of the supported area shown in Fig. 5, draws away from the periphery of the bottom surface 86 of the button as indicated at 90 in Fig. 6, and becomes a part of the unsupported area of the diaphragm so that the relative values of X and Y change since the unsupported area is increased by the area included in the withdrawn portion. Therefore the ratio of the supported area X to the unsupported area Y does not remain constant throughout the valve stroke. And in this connection, it will be understood that the effective area of the diaphragm is substantially equal to the area of that portion of the diaphragm which is supported by the button, namely, the supported area, plus approximately one half of that portion of the area of the diaphragm which surrounds the button, namely, the unsupported area, since approximately one half of the pressure load on the last mentioned area is carried by the flanges 52 and 53. Therefore if the value X of the supported area varies in relation to the value Y of the unsupported area over the range of diaphragm movement, the total effective area of the diaphragm varies throughout said range of movement and accordingly, the force required by the spring 67 to maintain the parts in balance varies over said range. This will be apparent from the following:

Let it be assumed, for purposes of illustration, that:

$X$ = Effective area of the button
$Y$ = Unsupported diaphragm area
$X+Y$ = Free diaphragm area $X + \dfrac{Y}{2}$ = Effective diaphragm area $P$ = Controlled fluid pressure $F$ = Spring force = $XP + \dfrac{YP}{2}$ Referring to Fig. 5 wherein, $X$ = 5 square inches
$Y$ = 2 square inches
$P$ = 10 p. s. i.

We have the following:

$$F = (5)(10) + \dfrac{(2)(10)}{2} = 60 \text{ lbs.}$$

Referring to Fig. 6 wherein the ratio of supported to unsupported diaphragm areas has changed, if it is assumed that, $X$ = 4 square inches
$Y$ = 3 square inches
$P$ = 10 p. s. i.

We have the following:

$$F = (4)(10) + \dfrac{(3)(10)}{2} = 55 \text{ lbs.}$$

Therefore, it will be noted that if the spring 67 is set to maintain a controlled pressure of 10 p. s. i. at high flows and for this purpose provides a force of 60 pounds, when the demand decreases so that low flows only occur through the main valve, the 60 pound force exerted by the spring 67 will be more than required to maintain a controlled pressure of 10 p. s. i. Therefore the controlled pressure must increase beyond the desired value to bring the parts to balance. On the other hand, if the spring 67 is set to maintain the desired controlled pressure of 10 p. s. i. at low flows, and for this purpose the spring exerts a force of 55 pounds, when high flows are needed to supply the load demand, the force exerted by the spring will be less than required to maintain the controlled pressure at 10 p. s. i. Therefore the controlled pressure must drop below the desired value to bring the parts to balance. In actual practice I have found that the varying force required by the spring throughout the range of valve movement not only provides an undesirable range of controlled pressure change but tends to render the control unstable so that under unfavorable conditions, hunting or cycling results.

From exhaustive tests conducted with a large number of valves, similar to the valve herein partly illustrated, in connection with the control of air, I have found that where various well known forms of diaphragm buttons were used, including the type of button shown in Figs. 5 and 6, rapid cycling occurred and a generally unsatisfactory performance resulted. On the other hand, where the improved form of diaphragm button herein disclosed was substituted, each of the valves provided a stable operation with entirely satisfactory results.

I prefer the construction herein illustrated, for the diaphragm structure is permitted to expand into the button to provide the circle of flex just referred to and, at the same time, the central portion of the diaphragm, which is engaged by the stem of the pilot valve 35, is reinforced by the button. Where the physical properties of the diaphragm and the force required to operate the valve 35, or other element to be actuated, are such that it is unnecessary for the button to reinforce the diaphragm, it may not be essential for the button to contact the entire area of the central portion of the diaphragm.

I am aware that so-called perforated diaphragms having a valve stem, or other element to be actuated, extending through the diaphragm opening and secured thereto by means of washers or the like, have been employed to rigidly connect the stem with the diaphragm to provide a fluid tight connection therewith and, in some instances, to mechanically distort the diaphragm with the object of increasing its life; but, so far as known to me, there is no instance wherein an imperforate diaphragm having a button disposed against one face only and a valve stem, or similar element, engaging the diaphragm without mechanical connection therewith, has been provided with means which coact with the fluid pressure to distort the diaphragm within and without the effective area of the button to maintain the ratio of supported and unsupported diaphragm areas substantially constant throughout the range of diaphragm movement.

Having thus described my invention, what I claim as new and desire to secure by Letters Patent is:

1. In a fluid-pressure operated motor for control valves and the like the combination with a housing having a cylindrical inner wall, a metallic diaphragm clamped at its periphery to said housing and having an imperforate free area defining together with said housing a fluid pressure chamber, an element to be actuated in engagement with said metallic diaphragm, and including a stem having a rounded end, a passage in communication with said chamber for communication with a source of fluid pressure, and yielding means developing a force for opposing the pressure in said chamber, of means transmitting said force to the center portion of said metallic diaphragm and retaining said force centered in the free area thereof, comprising, a button having a cylindrical side wall portion and a cone-shaped recess portion, the wall of said recess portion being adapted to engage said metallic diaphragm and providing to said diaphragm a correspondingly cone-shaped central portion the apex of which is engaged by the rounded end of the stem of said element, said wall portion and said wall of said recess portion forming in cross section an acute angle and at their juncture providing a circular knife edge by which the metallic diaphragm receives a sharp indentation when expanded within and without said recess solely by the fluid pressure in said chamber, said indentation forming a circle of flex and establishing both a fixed position for said button at the central portion of said diaphragm and a definite line of demarcation between the supported and unsupported areas of the diaphragm to maintain the relative ratio of said areas constant throughout a selected range of diaphragm movement.

2. In a fluid pressure operated motor for control valves the combination with a housing having a control port, a cylindrical inner wall, and a cylindrical guide wall disposed axially of said control port, a metallic diaphragm clamped at its periphery to said housing and having an imperforate free area centered axially of said port and defining together with said housing a fluid pressure chamber, a valve member cooperating with said port having a valve stem provided with a rounded end in engagement with said diaphragm, a passage in communication with said chamber for communication with a source of fluid pressure, yielding means developing a force for opposing the pressure in said chamber, means transmitting said force to the center portion of said metallic diaphragm and retaining said force centered in the free area thereof, comprising, a button having a cylindrical side wall making a sliding fit within the guide wall portion of said housing, said button having an end wall engaged by said yielding means and a cone-shaped end wall engaged by said diaphragm, the cone-shaped end wall of said button providing to said diaphragm a of said button providing to said diaphragm a correspondingly cone-shaped central portion at the apex of which the rounded end of said valve stem is centered and together with said cylindrical side wall forming in cross section an acute angle and at their juncture providing a circular knife edge by which the metallic diaphragm receives a sharp indentation when expanded within and without the cone-shaped end wall of said button solely by the fluid pressure in said chamber, said sharp indentation forming a circle of flex for said metallic diaphragm and establishing both a fixed position for said button axially of said port and a definite line of demarcation between the supported and unsupported areas of the diaphragm to maintain the relative ratio of said areas constant throughout a selected range of diaphragm movement.

RUEL E. TAYLOR, Jr.

REFERENCES CITED

The following references are of record in the file of this patent:

UNITED STATES PATENTS

| Number | Name | Date |
| --- | --- | --- |
| 643,519 | Miller | Feb. 13, 1900 |
| 963,045 | Hulse | July 5, 1910 |
| 1,665,719 | Schnepp | Apr. 10, 1928 |
| 1,691,758 | Fausek | Nov. 13, 1928 |
| 1,712,697 | Frankenberg | May 14, 1929 |
| 2,061,905 | Hewitt | Nov. 24, 1936 |